United States Patent [19]
Saiki et al.

[11] Patent Number: 5,379,298
[45] Date of Patent: Jan. 3, 1995

[54] MULTIMEDIA MULTIPLEXER DEVICE HAVING AUTOMATIC PARAMETER RECOGNIZING AND SETTING FUNCTION, AND COMMUNICATIONS SYSTEMS INCLUDING MULTIMEDIA MULTIPLEXER DEVICES

[75] Inventors: Koichi Saiki; Toshihiko Tanegashima, both of Kawasaki, Japan

[73] Assignee: Fujitsu Limited, Japan

[21] Appl. No.: 36,429

[22] Filed: Mar. 24, 1993

[30] Foreign Application Priority Data

Mar. 25, 1992 [JP] Japan ................... 4-066540

[51] Int. Cl.6 ............ H04J 3/22; H04J 9/00
[52] U.S. Cl. ........................ 370/79; 370/112
[58] Field of Search ............ 370/58.1, 58.2, 58.3, 370/60, 62, 67, 77, 79, 84, 85.1, 85.13, 94.1, 94.3, 110.1, 112, 118, 17, 61

[56] References Cited
U.S. PATENT DOCUMENTS

| | | | |
|---|---|---|---|
| 4,271,507 | 6/1981 | Gable et al. | 370/79 |
| 4,574,284 | 3/1986 | Feldman et al. | 370/79 |
| 4,653,047 | 3/1987 | Vij et al. | 370/67 |
| 4,677,611 | 6/1987 | Yanosy, Jr. et al. | 370/85.13 |

FOREIGN PATENT DOCUMENTS 63-131766  6/1988  Japan .
63-182941  7/1988  Japan .
2-100432   4/1990  Japan .

*Primary Examiner*—Alpus H. Hsu
*Attorney, Agent, or Firm*—Greer, Burns & Crain

[57] ABSTRACT

In a multimedia multiplexer device coupled to communications devices and a line terminating unit, a first unit provides a plurality of predetermined interfaces suitable for the communications devices and the line terminating unit. A second unit receives control signals from the communications devices and the line terminating unit and identifies parameter information concerning suitable interfaces from the control signals. A third unit selects the suitable interfaces from the plurality of predetermined interfaces in accordance with the parameter information identified by the second unit, and makes the first unit provide the suitable interfaces from the plurality of predetermined interfaces.

12 Claims, 10 Drawing Sheets

OPERATION OF NETWORK PORT UNIT 140 OF MUX 101

OPERATION OF DEVICE CONTROLLER 130 OF MUX 101

OPERATION OF NMP 106

OPERATION OF NETWORK PORT UNIT 180
(LINE SETTING UNIT 190)

MULTIMEDIA MULTIPLEXER DEVICE HAVING AUTOMATIC PARAMETER RECOGNIZING AND SETTING FUNCTION, AND COMMUNICATIONS SYSTEMS INCLUDING MULTIMEDIA MULTIPLEXER DEVICES

BACKGROUND OF THE INVENTION

1. Field of the Invention

The present invention generally relates to multimedia multiplexer devices, and more particularly to a multimedia multiplexer device capable of automatically recognizing and setting parameters to be used for communications.

2. Description of the Prior Art

Recently, there has been considerable activity in the development of private network systems. For example, a private network system has multimedia multiplexer devices that function as the core units in the private network system. Various communications devices are connected to the multimedia multiplexer devices, which are connected to each other via transmission lines. Examples of the communications devices are private branch exchanges, packet switches, and video conference systems.

The communications devices communicate with the multimedia multiplexer devices regarding parameters necessary for transmission of communications therebetween. Examples of these parameters are transmission bit rate (clock frequency), coding method, and frame structure. For example, data encoded by a first coding method and arranged in a first frame format is transferred between the private branch exchange and the multimedia multiplexer device at a first bit rate. Data encoded by a second coding method and arranged in a second frame format is transferred between the packet switch and the multimedia multiplexer device at a second bit rate. In the above manner, the communications device communicates with the multimedia multiplexer devices regarding the parameters inherent in the types of multimedia (communications devices).

Further, the multimedia multiplexer devices communicate with each other via respective line terminating devices connected to each other via the transmission lines. The multimedia multiplexer devices communicate with the respective line terminating devices according to respective parameters.

It can be seen from the above that the multimedia multiplexer devices are required to provide for all the parameters and select suitable parameters in response to a request for communications.

FIG. 1 is a block diagram of a conventional private network system, and FIG. 2 is a block diagram of the structure of each multimedia multiplexer device.

Referring to FIG. 1, the private network system includes multimedia multiplexer devices (MUX) 1 and 8, which are installed in factories A and B of a company, respectively. The MUXs 1 and 8 communicate with each other via line terminating units (CSU) 5 and 7 and a transmission line L. A private branch exchange (PBX) 2, a packet switch (PKT SW) 3, and a video conference system (VCS) are connected to the MUX 1. Similarly, a private branch exchange (PBX) 9, a packet switch (PKT SW) 10, and a video conference switch (VCS) 11 are connected to the MUX 8. Telephone sets, facsimile machines and so on are connected to the PBXs 2 and 9.

Voice data is transferred between the PBX 2 (9) and the MUX 1 (8) according to predetermined parameters inherent in transmission of the voice data. Packet data is transferred between the packet switch 3 (10) and the MUX 1 (8) according to predetermined parameters inherent in transmission of the packet data. Voice data and video data are transferred between the video conference system 4 (11) and the MUX 1 (8) according to predetermined parameters inherent in transmission of the voice data and video data. The MUX 1 (8) multiplexes signals received from the devices 2 (9), 3 (10) and 4 (11) to thereby generate a multiplexed signal, which is sent to the line terminating unit 5 (7). The MUX 1 (8) also has the function of demultiplexing a multiplexed signal received from the line terminating unit 5 (7) into original signals sent from the PBX 9 (2), 10 (3) and 11 (4).

The line terminating unit 5 (7) establishes an interface between the MUX 1 (8) and the transmission line L. The multiplexed signal is transferred between the MUX 1 (8) and the line terminating unit 5 (7) according to predetermined parameters inherent in transmission of the multiplexed signal.

A network managing processor (NMP) 6, which is connected to the MUX 1, manages the entire private network system. An external storage device 12 is connected to the network managing unit 6.

The MUX 1 has a structure shown in FIG. 2. The MUX 8 has the same structure as the MUX 1. The MUX 1 includes a device controller 13, a network port unit 14, line setting units 15 and an interface unit 16 where m is an integer. The device controller 13 is connected to the structural elements in the MUX 1 via control buses indicated by dotted lines, and performs the overall control of the MUX 1. The network port unit 14 multiplexes data from the line setting units 15 via data buses indicated by solid lines, and sends a multiplexed signal to the line terminating unit 5. Each of the line setting units 15 transfers data from the communications devices, such as the PBX 2, the packet switch 3 and the video conference system 4, to the network port unit 14. The MUX 1 communicates with the network managing processor 6 via the interface unit 16.

Conventionally, all the parameters used in the private network system are studied and the appropriate values of the parameters are determined before starting to operate the private network system or new communications devices newly connected to the MUX. More particularly, the maintenance person or the user must recognize the parameters necessary for transmission of data between each of the devices 2 (9), 3 (10) and 4 (11) and the MUX 1 (8) and selects the appropriate values of the parameters. The values of the parameters (parameter information) are determined by the network managing processor 6 and recorded in the external storage device 12. Then, the parameter information is read from the external storage device 12 and loaded in the structural elements of the MUX 1 under control of the network managing processor 6.

For example, if a second PBX is connected to the MUX 1 in addition to the (first) PBX 2, the maintenance person or the user recognizes what parameters are used to transfer data between the second PBX and the MUX 1, and determines appropriate values of the parameters. Then, the maintenance person or the user formulates information concerning the identified parameters (parameter values) and records the parameter information in the external storage device 12. Then, the parameter information is loaded in the structural elements of the MUX 1 under control of the network managing processor 6. A similar procedure is needed if the existing communications devices are modified.

As described above, it is necessary to manually recognize what parameters are used for data transfer and manually determine the appropriate values of these parameters.

SUMMARY OF THE INVENTION

It is a general object of the present invention to provide a multimedia multiplexing device in which the above disadvantage is eliminated.

A more specific object of the present invention is to provide a multimedia multiplexing device having an automatic parameter recognizing and setting function.

The above objects of the present invention are achieved by a multimedia multiplexer device coupled to communications devices and a line terminating unit, the multimedia multiplexer device comprising:

first means for providing a plurality of predetermined interfaces suitable for the communications devices and the line terminating unit;

second means for receiving control signals from the communications devices and the line terminating unit and for identifying parameter information concerning suitable interfaces from the control signals; and third means, coupled to the first means and the second means, for selecting the suitable interfaces from among the plurality of predetermined interfaces in accordance with the parameter information identified by the second means and for making the first means provide the suitable interfaces from among the plurality of predetermined interfaces.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENT

Figure 3:
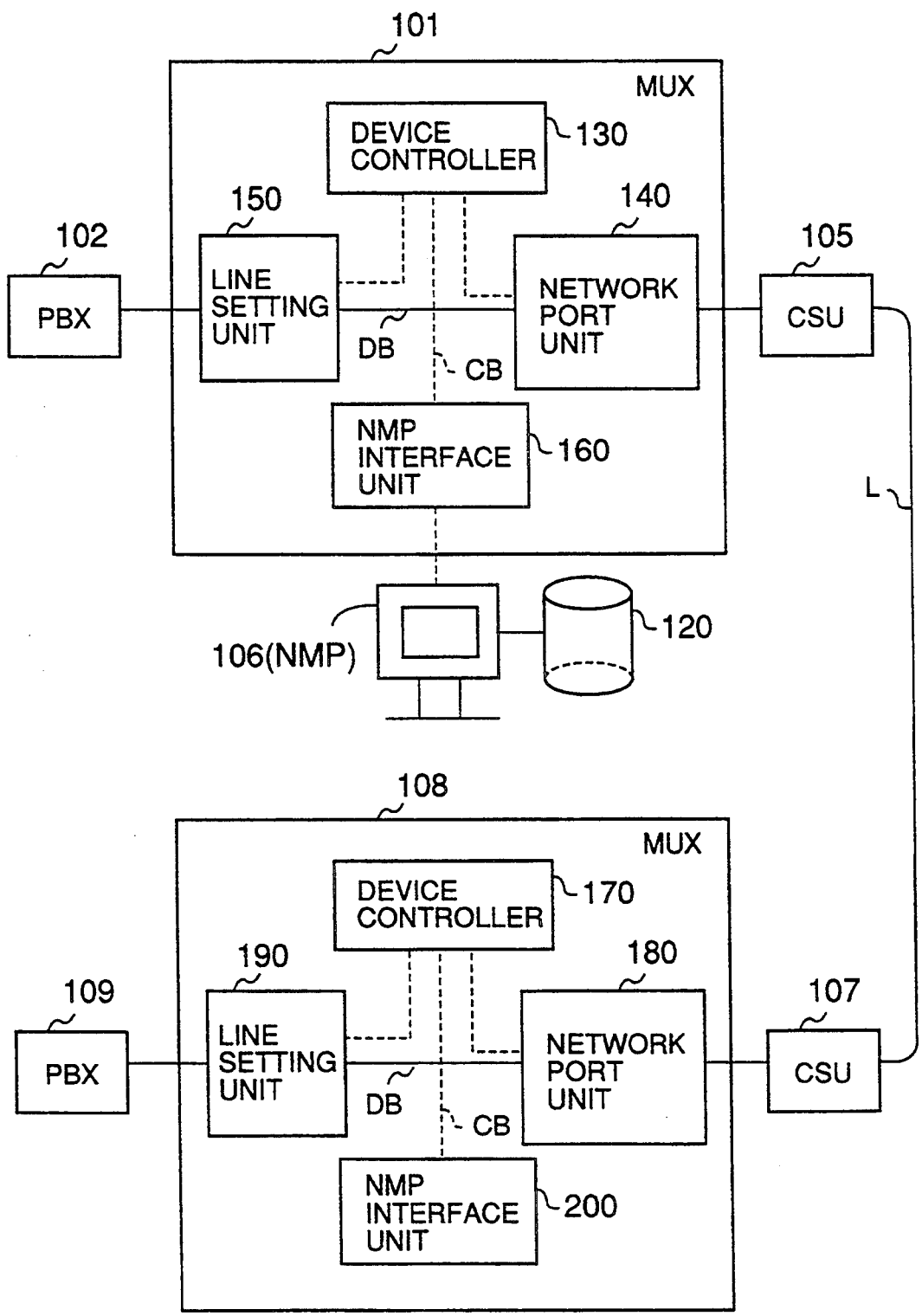
FIG. 3 is a block diagram of an embodiment of the present invention.

FIG. 3 is a block diagram of a private network system according to an embodiment of the present invention. The private network system shown in FIG. 3 comprises two multimedia multiplexing devices (MUX) 101 and 108, and line terminating units 105 and 107. A transmission line L connects the MUXs 101 and 108 via the line terminating units 105 and 107. A network managing processor (NMP) 106 is connected to the MUX 101. An external storage device 120 is connected to the network managing processor 106. A PBX 102 is connected to the MUX 101. In practice, a plurality of communications devices, such as PBXs, packet switches and/or video conference systems can be connected to the MUX 101. However, only the PBX 102 is illustrated in FIG. 3. A PBX 109 is connected to the MUX 108. In practice, a plurality of communications devices, such as PBXs, packet switches and/or video conference systems can be connected to the MUX 108.

Figure 1:
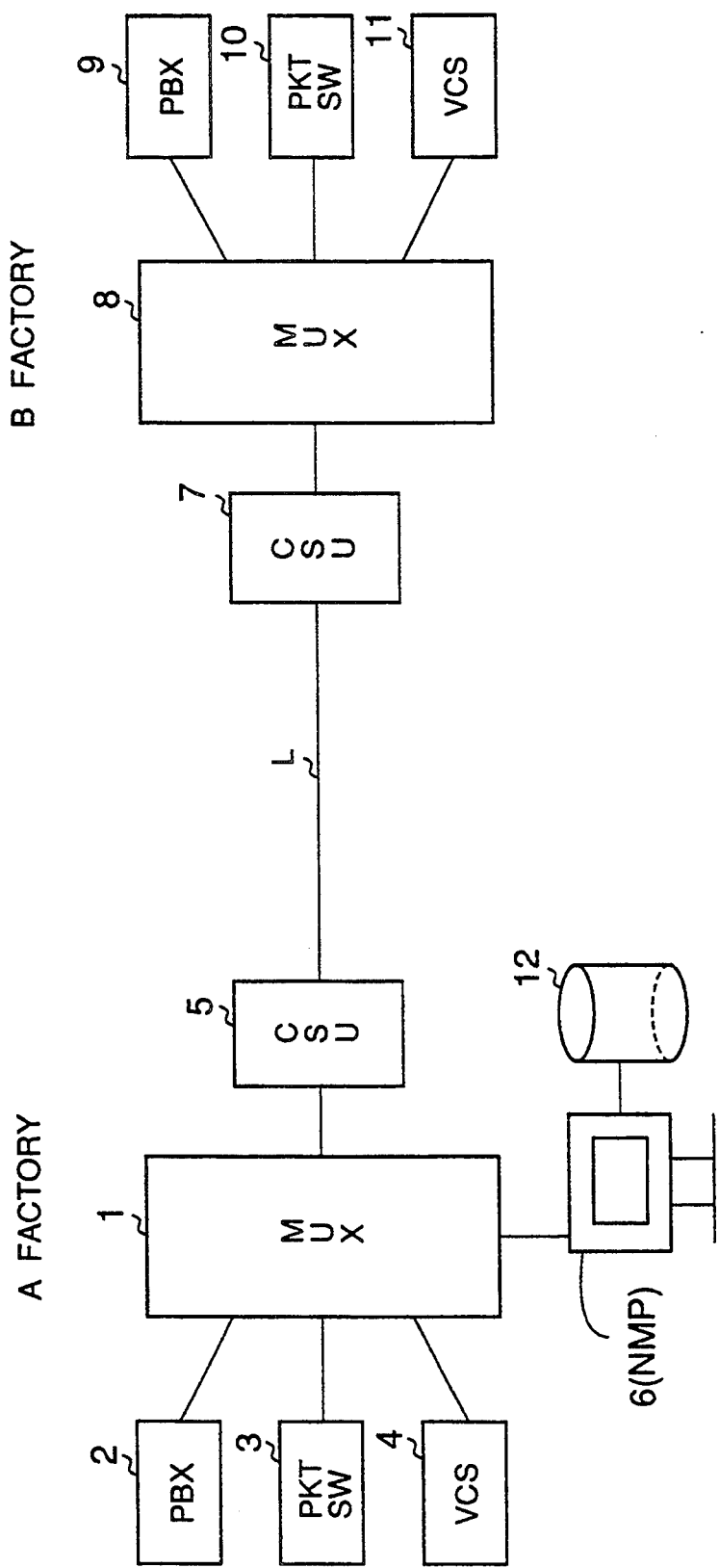
FIG. 1 is a block diagram of a conventional private network system.
Figure 2:
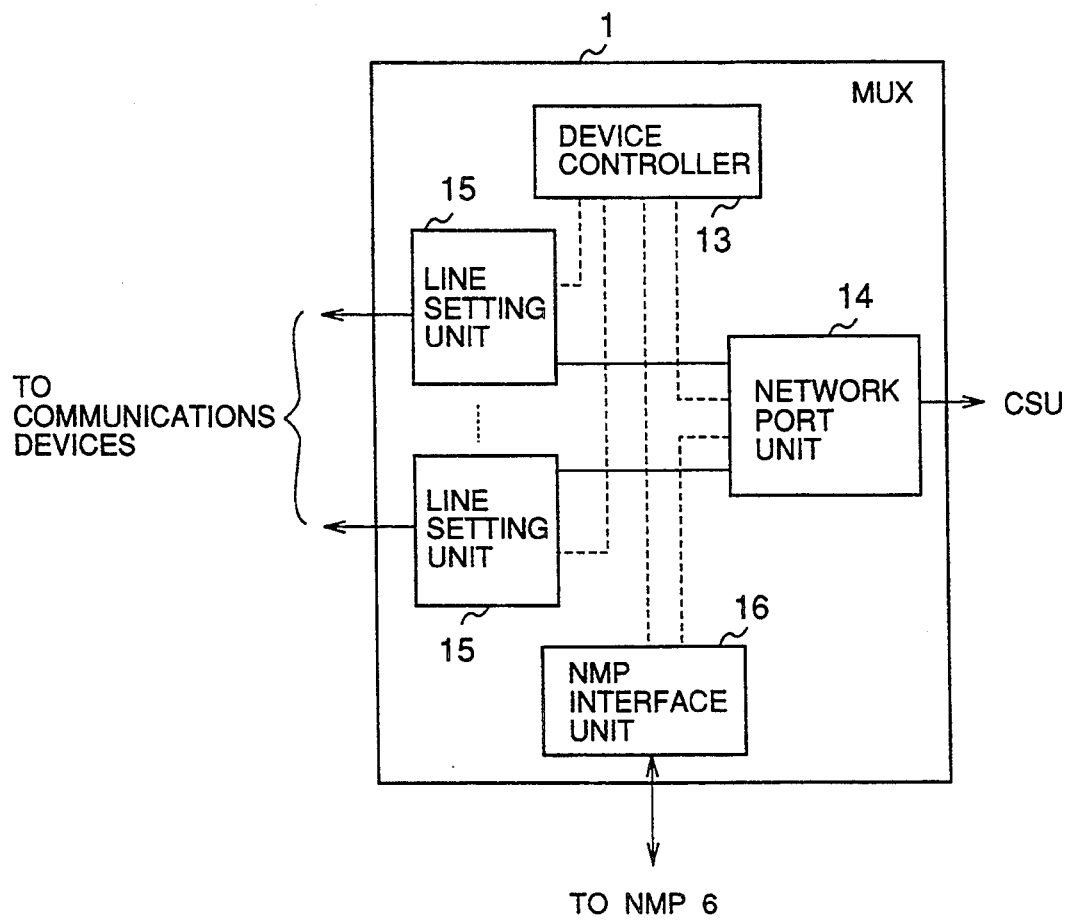
FIG. 2 is a block diagram of the structure of each multimedia multiplexing device.

The MUX 101 comprises a device controller 130, a network port unit 140, a line setting unit 150 and an interface unit 160. The network port unit 140 and the line setting unit 150 are connected to each other via a data bus DB represented by a solid line in FIG. 3. The device controller 130 is connected to the network port unit 140, the line setting unit 150 and the interface unit 160 via control buses CB represented by broken lines in FIG. 3. The network managing processor 106 is connected to the interface unit 160. In practice, a plurality of line setting units 150, to which various communications devices can be connected, are provided and connected to the network port unit 140 via respective data buses in the same manner as shown in FIG. 2. However, only one line setting unit 150 is illustrated in FIG. 3 for the sake of simplicity.

As will be described in detail later, the network port unit 140 and the line setting unit 150 have respective structures different from those of the network port unit 14 and the line setting units 15 shown in FIG. 2.

The MUX 109 comprises a device controller 170, a network port unit 180, a line setting unit 190 and an interface unit 200. The network port unit 180 and the line setting unit 190 are connected to each other via a data bus DB represented by a solid line in FIG. 3. The device controller 170 is connected to the network port unit 180, the line setting unit 190 and the interface unit 200 via control buses CB represented by broken lines in FIG. 3. In practice, a plurality of line setting units 190, to which various communications devices can be connected, are provided and connected to the network port unit 180 via respective data buses in the same manner as shown in FIG. 2. However, only one line setting unit 190 is illustrated in FIG. 3 for the sake of simplicity.

As will be described in detail below, the network port unit 180 and the line setting unit 190 of FIG. 3 have similar structures and those structures are different from those the network port unit 14 and the line setting units 15 shown in FIG. 2.

Figure 4:
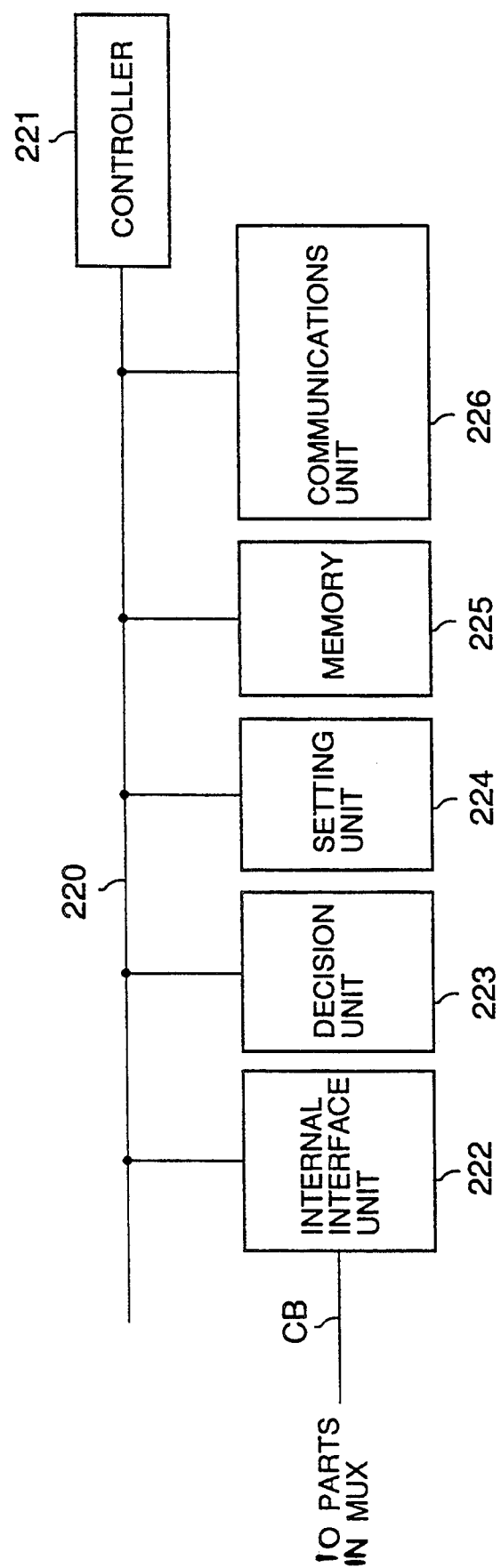
FIG. 4 is a block diagram of a device controller shown in FIG. 3.

FIG. 4 is a block diagram of the device controller 130 and the device controller 170 shown in FIG. 3.

The device controller 130 comprises a controller 221, an internal interface unit 222, a decision unit 223, a setting unit 224, a memory 225 and a communications unit 226. The controller 221 controls the overall operation of the device controller 130. The internal interface unit 222 establishes an interface with the network port unit 140, the line setting unit 150 and the interface unit 160. The decision unit 223 gathers pieces of parameter information sent from the network port unit 140 and the line setting unit 150, and makes a decision concerning the parameters to be used. More particularly, the decision unit 223 determines parameters (related to, for example, the bit rate and encoding method) to be set in the network port unit 140 and the line setting unit 150, and transfers setting information concerning the decided-on parameters, which are to be set in the network port unit 140 and the line setting unit 150, to the setting unit 224.

The setting unit 224 transfers the received setting information concerning the parameters to the network port unit 140 and the line setting unit 150 via an internal control bus 220, the internal interface unit 222 and the control bus CB, and further transfers the received setting information concerning the parameters to the memory 225. The memory 225 stores the received setting information concerning the parameters. When the parameter information sent from the setting unit 224 is written into the memory unit 225, the memory unit 225 generates write data existence information. In response to receipt of the write data existence information from the memory 225, the communications unit 226 reads all the data from the memory 225 and transfers the read data to the network managing processor 106 via the internal control bus 220, the internal interface unit 222 and the control bus CB.

Figure 5:
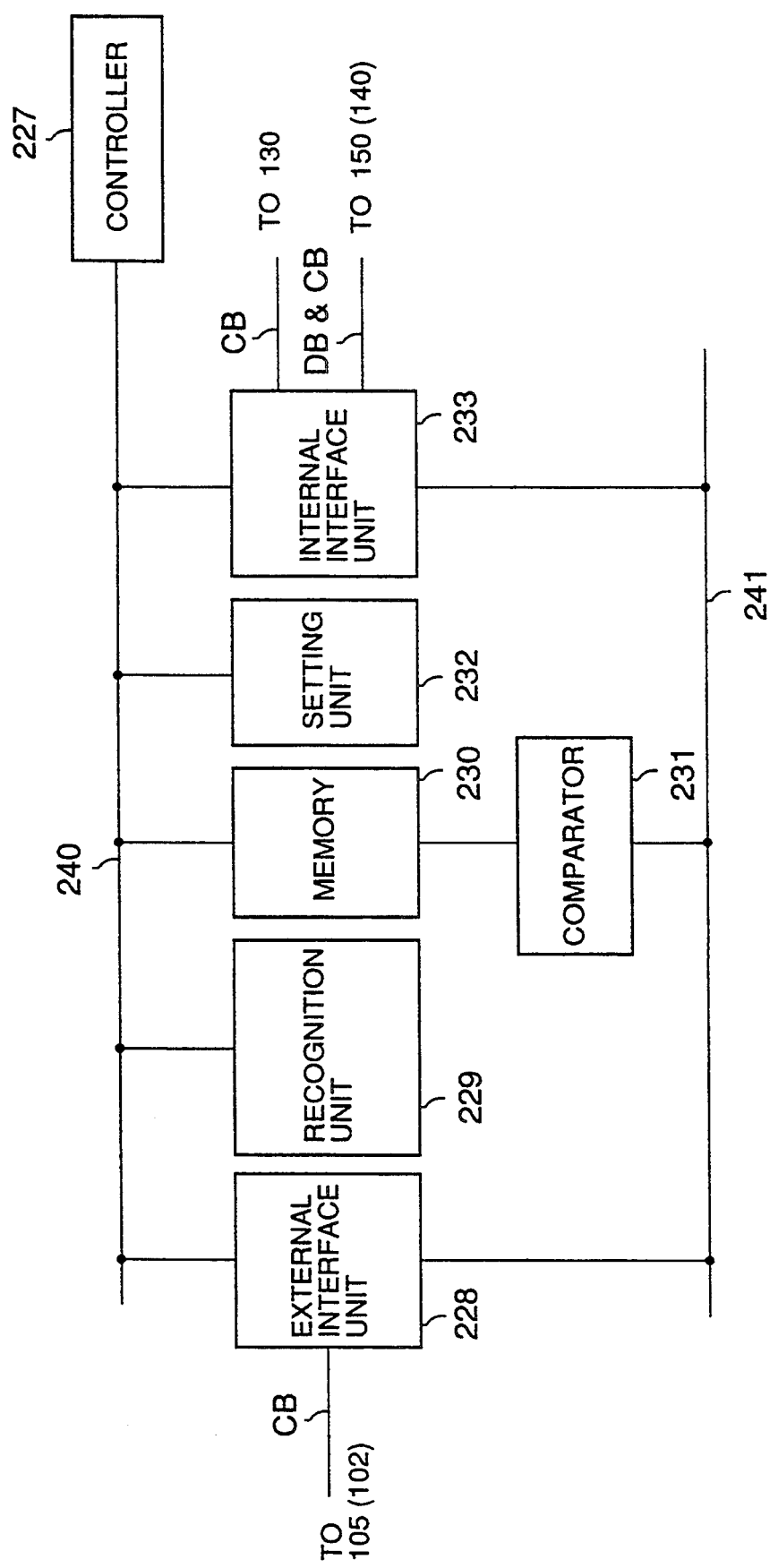
FIG. 5 is a block diagram of a network port unit (and a line setting unit) shown in FIG. 3.

FIG. 5 is a block diagram of the network port unit 140 of the MUX 101 show in FIG. 3. The network port unit 180 of the MUX 108 shown in FIG. 3 has the same structure as the network port unit 140. The line setting unit 150 of the MUX 101 shown in FIG. 3 has the same structure as the network port unit 140, and the line setting unit 190 of the MUX 108 shown in FIG. 3 has the same structure as the network port unit 140.

A controller 227 connected to an internal control bus 240 controls the overall operation of the network port unit 140. An external interface unit 228 of the network port unit 140 establishes an interface with the line terminating unit 105. The external interface unit 228 is connected to the internal control bus 240, and an internal data bus 241. The external interface unit 228 of the line setting unit 150 establishes an interface with the communications devices, such as a PBX, a packet switch or a video conference system (PBX 102 in the case shown in FIG. 3). An internal interface unit 233, which is connected to the internal control bus 240 and the internal data bus 241, establishes an interface with the device controller 130, the line setting unit 150 (the network port unit 140 in the case of the line setting unit 150), and the interface unit 160 via the data bus DB and the control bus CB.

A recognition unit 229, which is connected to the internal control bus 240, automatically recognizes, from a control signal received via the external interface unit 228, parameters used for the MUX 101 and the PBX 102 connected to the external interface unit 228 of the line setting unit 150. Then, the recognition unit 228 sends, as parameter information, the results of the recognition to a memory 230, which stores the received parameter information. The parameter information is periodically sent to the memory 230, and the parameter information stored in the memory 230 is updated each time the parameter information is received.

A comparator 231, which is connected between the memory 230 and the data bus 241, compares the parameter information obtained at time t=n with parameter information obtained at time t=n+1. When the parameter information obtained at time t=n does not match the parameter information obtained at time t=n+1, it is concluded that a change in the connection condition (interface) has been made. At this time, the parameter information obtained at time t=n+1 is sent to the device controller 130 via the internal interface unit 233.

A setting unit 232 receives setting information concerning the parameters sent from the device controller 130, and sets the parameters specified by the parameter setting information in the external interface unit 228.

A description will now be given of the operation of the embodiment of the present invention.

Figure 6:
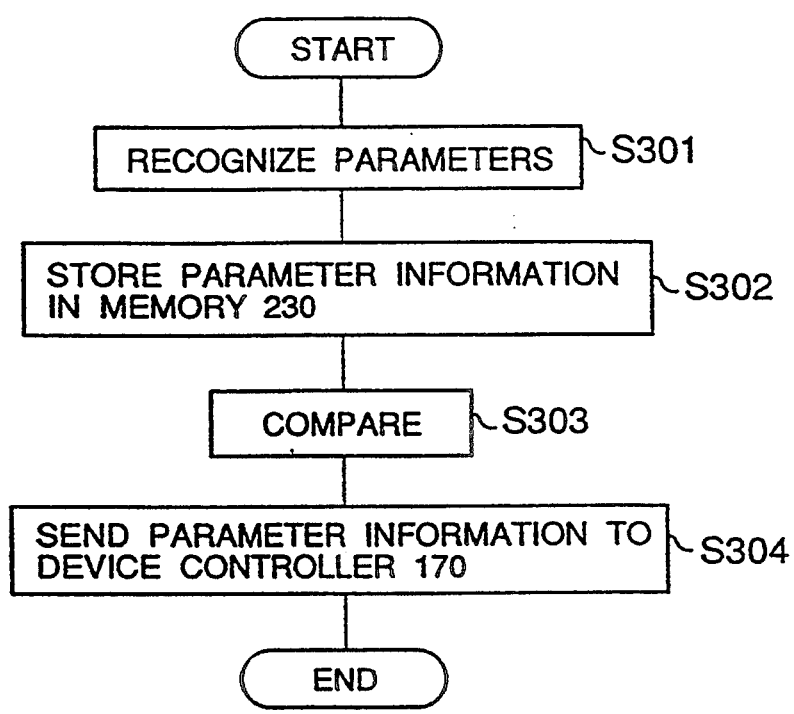
FIG. 6 is a flowchart illustrating the operation of the network port unit (and the line setting unit) shown in FIG. 5.

After the power supply is turned ON, the network port unit 180 and the line setting unit 190 of the MUX 108 operate as shown in FIG. 6. The following description relates to the operation of the line setting unit 190. The operation of the network port unit 180 is the same as that of the line setting unit 190. In step S301, the line setting unit 190 performs a parameter recognition operation. More particularly, the external interface unit 228 of the MUX 108 shown in FIG. 5 receives an input signal (control signal) via the external interface unit 228, and transfers the received input signal to the recognition unit 229. The recognition unit 229 recognizes parameters to be used from the received input signal.

Figure 12:
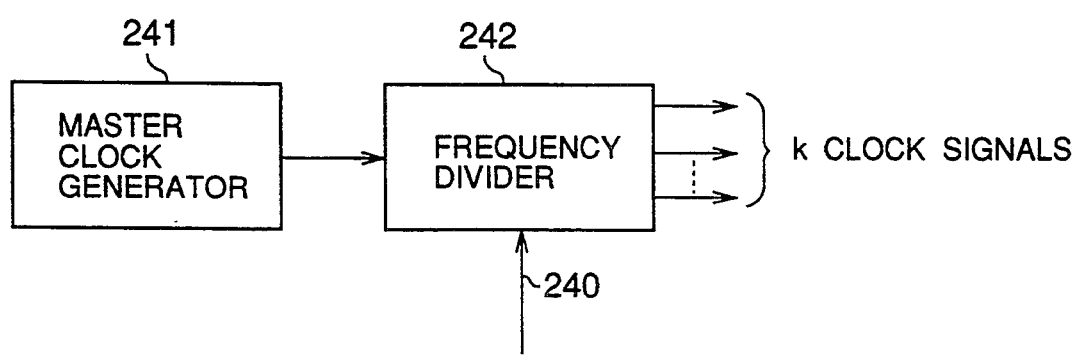
FIG. 12 is a block diagram of a part of an external interface unit shown in FIG. 5.

More particularly, as shown in FIG. 12, each of the MUXs 101 and 108 includes a master clock generator 241 and a frequency divider 242 connected to the control bus 240 (FIG. 5). The master clock generator 241 generates a master clock signal, and the frequency divider 242 generates clock signals by dividing the frequency of the master clock signal. The recognition unit 229 identifies the clock signal from the input signal.

Further, the recognition unit 229 identifies the encoding method from the received input signal. The external interface unit 228 is capable of performing a plurality of encoding methods. Furthermore, the recognition unit 229 identifies the frame structure from the received input signal. Information concerning the identified parameters is transferred, as parameter information, to the memory 230.

In step S302 shown in FIG. 6, the memory 230 stores the parameter information sent from the recognition unit 229 under the control of the controller 227.

In step S303, the comparator 231 compares the parameter information obtained at time t=n with that of time t=n+1. When the parameter information obtained at time t=n does not match the parameter information obtained at time t=n+1, the comparator 231 transfers the parameter information obtained at time t=n+1 to the device controller 170 via the internal interface unit 233 and the control bus CB.

Figure 7:
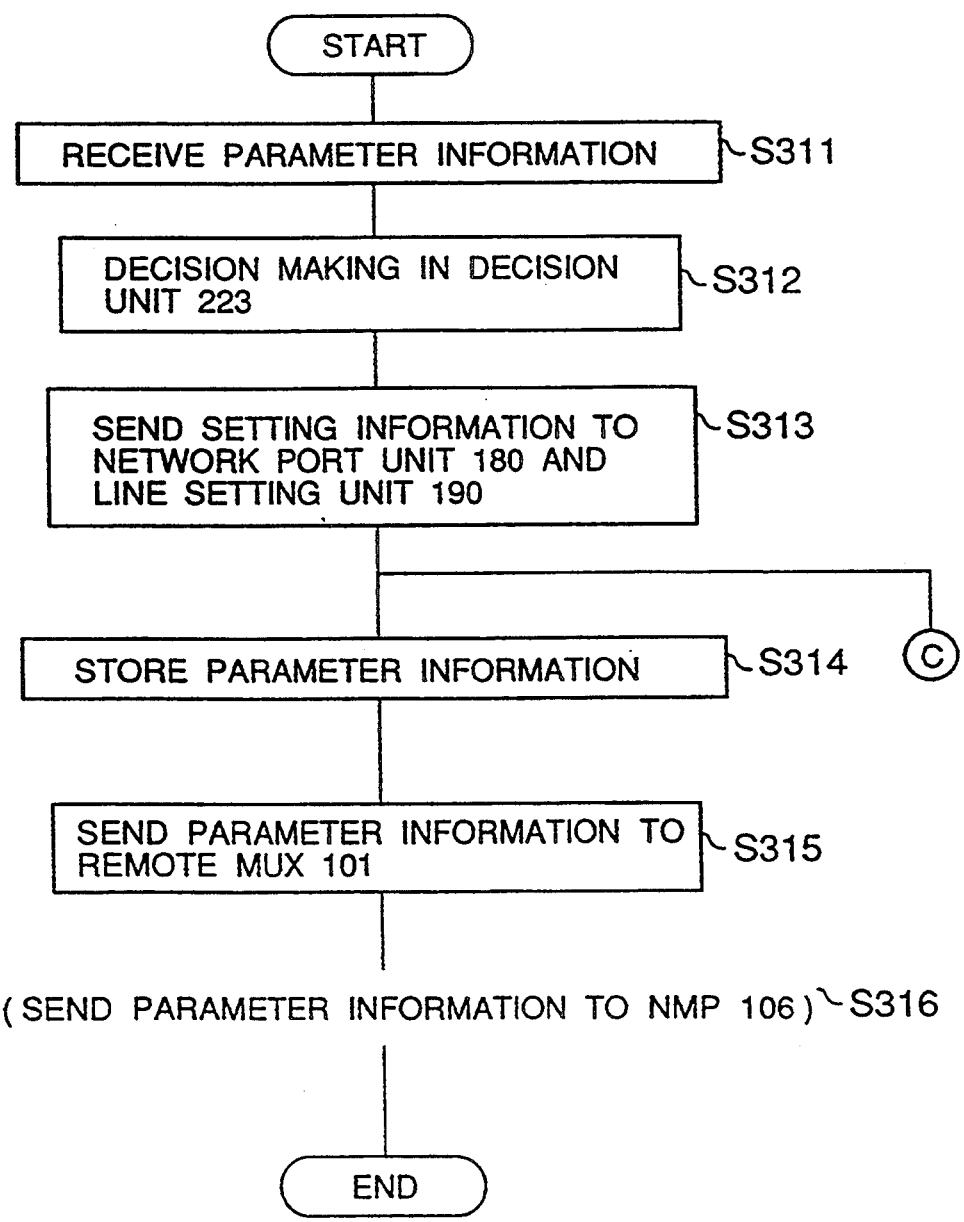
FIG. 7 is a flowchart illustrating the operation of the device controller shown in FIG. 4.

FIG. 7 is a flowchart illustrating the operation of the device controller 170 of the MUX 108. The internal interface unit 222 of the device controller 170 shown in FIG. 4 receives the parameter information transferred via the control bus CB in step S311. In step S312, the decision unit 223 determines whether or not the parameter information can be correctly set. More particularly, the decision unit 223 receives the parameter information, and compares the received parameter information with information concerning predetermined parameters that can be selectively set in the line setting unit 190. When the received parameter information matches one of the pieces of the predetermined parameter information, it is concluded that the received parameter information can be correctly set. Then, the decision unit 223 transfers the received parameter information to the setting unit 224.

In step S313, the setting unit 224 sends setting information regarding the received parameter information to the control bus 220.

In step S314, the memory 225 stores the parameter information sent from the setting unit 224. Then, the parameter information is sent to the communications unit 226. The memory 225 stores information concerning all the parameters set in the network port unit 180 and the line setting unit 190.

In step S315, the communications unit 226 sends the parameter information read from the memory 225 to the remote MUX 101 via the network port unit 180. More particularly, the communications unit 226 receives the parameter information from the memory 225 and broadcasts it to the network port unit 180 and the interface unit 200 via the internal interface unit 222 and the control bus CB under the control of the controller 221. Since the network managing processor is not connected to the interface unit 200, the interface unit 200 discards the received parameter information. The network port unit 180 adds a device address ("01" for example) to the parameter information. The device address indicates the address of the communications device (PBX) 109 connected to the MUX 108 via its line setting unit 190.

Figure 8:
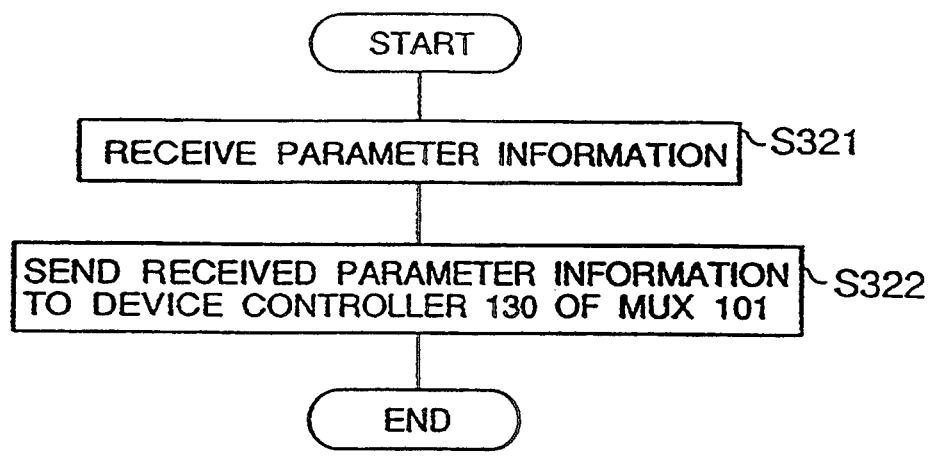
FIG. 8 is a flowchart illustrating the operation of the network port unit shown in FIG. 5.

FIG. 8 is a flowchart illustrating the operation of the network port unit 140 of the MUX 101 to which the network managing processor 106 is connected. In step S321, the external interface unit 228 of the network port unit 140 of the MUX 101 receives the parameter information sent from the MUX 108. In step S322, the external unit 228 recognizes the device address added to the parameter information, and transfers it together with the parameter information to the device controller 130 via the internal interface unit 233 under the control of the controller 227.

Figure 9:
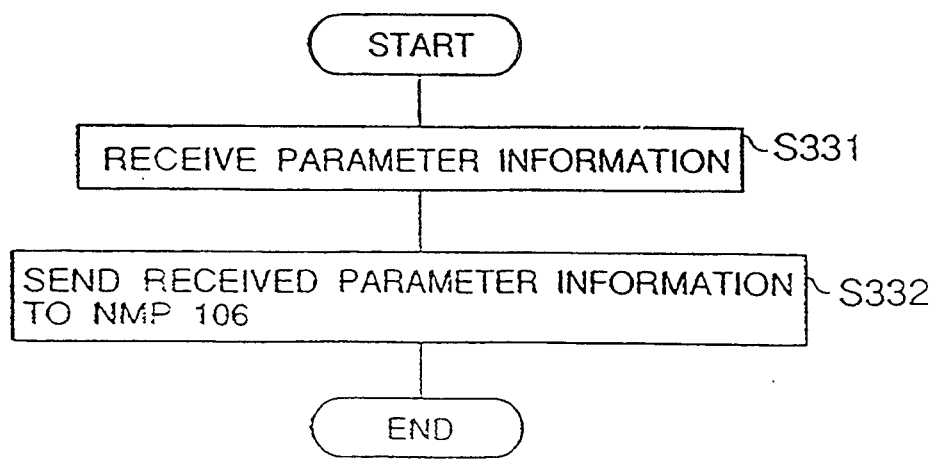
FIG. 9 is a flowchart illustrating the operation of the device controller shown in FIG. 4.

FIG. 9 is a flowchart illustrating the operation of the device controller 130 of the MUX 101. In step S331, the internal interface unit 222 receives the parameter information transferred via the control bus CB, and recognizes the device address added to the parameter information. Then, the internal interface unit 222 sends the received parameter information with the device address added thereto to the communications unit 226. In step S332, the communications unit 226 transfers the parameter information with the device address to the network managing processor 106 via the control bus CB and the interface unit 160.

Figure 10:
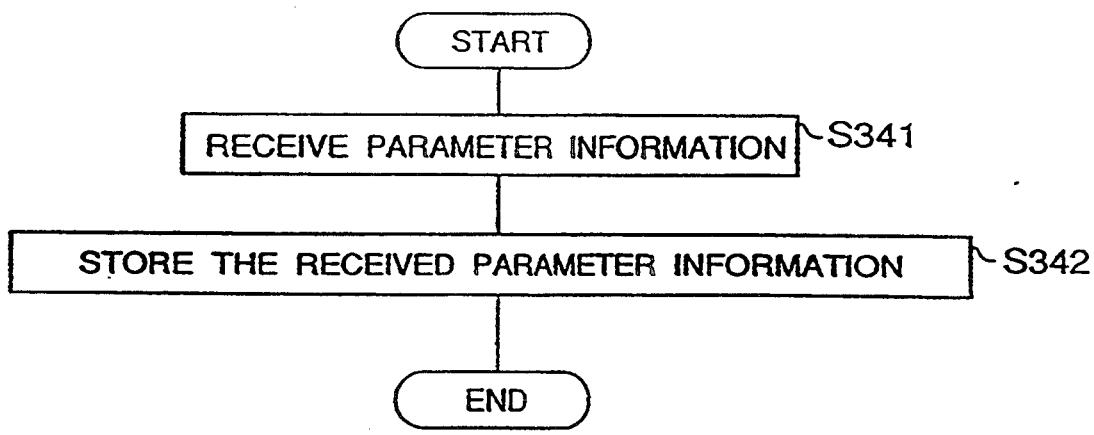
FIG. 10 is a flowchart illustrating the operation of a network managing unit.

FIG. 10 is a flowchart illustrating the operation of the network managing processor 106. In step S341, the network managing processor 106 receives the parameter information, and stores the received parameter information in the external storage device 120.

Figure 11:
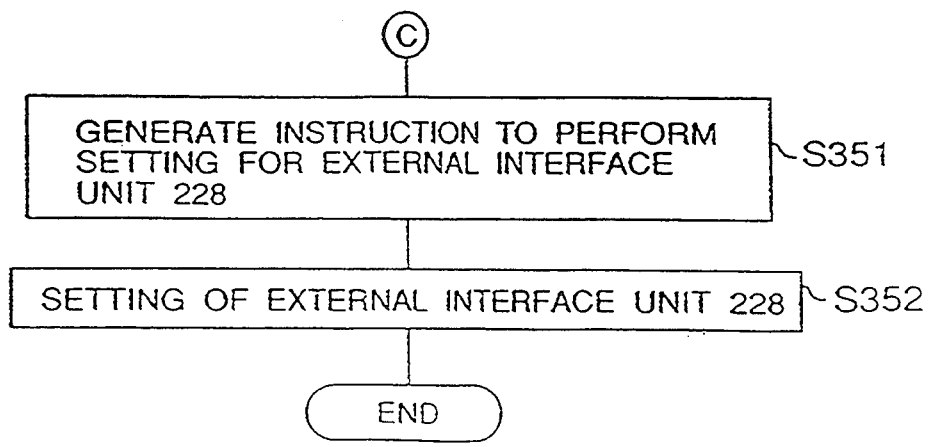
FIG. 11 is a flowchart illustrating the operation of the network port unit shown in FIG. 5.

FIG. 11 is a flowchart illustrating the operation of the line setting unit 190. The operation of the network port unit 180 is the same as that shown in FIG. 11. In step S351, the setting unit 229 of the line setting unit 190 receives the parameter setting information regarding the identified parameters sent by the device controller 170 in step S313 shown in FIG. 7, and executes a parameter setting operation on the external interface unit 228. At this time, the setting unit 232 sends a parameter setting instruction to the external interface unit 228.

In step S352, the parameters are set in the external interface unit 228 in response to the parameter setting instruction from the setting unit 232. More particularly, the parameter instruction signal contains information indicating the clock frequency to be used. The above information is applied to the frequency divider 242 by the setting unit 232 via the control bus 240. The parameter setting instruction also includes information indicating the identified encoding method. The external interface unit 228 is capable of selectively providing predetermined encoding methods, and one of the predetermined encoding methods is selected in accordance with the above information. Further, the parameter setting information contains information specifying the identified frame structure. The external interface unit 228 is capable of handling predetermined frame structures, and one of the predetermined frame structures is selected in accordance with the above information.

It will be noted that the flowchart of FIG. 6 also applies to the network port unit 140 and the line setting unit 150 of the MUX 101. The flowchart of the device controller 170 shown in FIG. 7 is applicable to the operation of the device controller 170 except that step S316 is carried out instead of step S315. In step S316, the device controller 170 sends the parameter information to the network managing processor 106. The operation of the network port unit 140 shown in FIG. 8 is applicable to the network port unit 180. The operation of the device controller 130 shown in FIG. 9 is applicable to the device controller 170. The operation of the network port unit 180 is applicable to the operation of the network port unit 140 and the line setting unit 150.

In accordance with the procedures shown in FIGS. 6 through 11, the MUX 101 (108) can be connected with the communications devices 102 (PBX in the case shown in FIG. 3) and the line terminating units 105 (107).

The present invention is not limited to the specifically disclosed embodiment, and variations and modifications may be made without departing from the scope of the present invention.

What is claimed is:

1. A multimedia multiplexer device coupled to communications devices and a line terminating unit, said multimedia multiplexer device comprising:
   a plurality of line setting units respectively provided for the plurality of communications devices;
   a port unit connected to said line setting units; said port unit and each of said line setting units including
   first means for providing a plurality of predetermined interfaces suitable for the communications devices and the line terminating unit;
   second means for receiving control signals from the communications devices and the line terminating unit and for identifying parameter information concerning suitable interfaces from the controls signals; and
   third means, coupled to said first means and said second means, for selecting the suitable interfaces from the plurality of predetermined interfaces in accordance with the parameter information identified by said second means and for making the first means provide the suitable interfaces from the plurality of predetermined interfaces.

2. The multimedia multiplexer device as claimed in claim 1, wherein said second means includes means for determining whether or not parameter information indicated by the control signals is the same as parameter information previously used.

3. The multimedia multiplexer device as claimed in claim 2, wherein said second means includes means for storing the parameter information previously used.

4. The multimedia multiplexer device as claimed in claim 1, wherein said parameter information includes information concerning a bit rate, an encoding method or a frame structure.

5. The multimedia multiplexer device as claimed in claim 1, wherein:
   the plurality of predetermined interfaces include interfaces based on types of the communications devices; and
   the types of the communications devices depend on data processed by the communications devices.

6. A communications system comprising:
   a plurality of multimedia multiplexer devices;
   network means for coupling the plurality of multimedia multiplexer devices via line terminating units; and
   a plurality of communications devices connected to the plurality of multimedia multiplexer devices,
   each of said multimedia multiplexer devices including:
   a plurality of line setting units respectively provided for the plurality of communications devices;
   a port unit connected to said line setting units; said port unit and each of said line setting units including
   first means for providing a plurality of predetermined interfaces suitable for the communications devices and a corresponding one of the line terminating units;
   second means for receiving control signals from corresponding communications devices among the plurality of communications devices and said corresponding one of the line terminating units and for identifying parameter information concerning suitable interfaces from the control signals; and
   third means, coupled to said first means and said second means, for selecting the suitable interfaces from the plurality of predetermined interfaces in accordance with the parameter information identified by said second means and for making the first means provide the suitable interfaces from the plurality of predetermined interfaces.

7. The communications system as claimed in claim 6, wherein said second means includes means for determining whether or not parameter information indicated by the control signals is the same as parameter information previously used.

8. The communications system as claimed in claim 7, wherein said second means includes means for storing the parameter information previously used.

9. The communications system as claimed in claim 6, wherein said parameter information includes information concerning a bit rate, an encoding method or a frame structure.

10. The communications system as claimed in claim 6, wherein:
    the plurality of predetermined interfaces include interfaces based on types of the communications devices; and
    the types of the communications devices depend on data processed by the communications devices.

11. The communications system as claimed in claim 6, further comprising a network managing processor which is connected to one of the multimedia multiplexer devices and controls an overall operation of the communications system.

12. The communications system as claimed in claim 11, further comprising fourth means, provided for each of the multimedia multiplexer devices except for said one of the multimedia multiplexer devices, for sending the parameter information to the network managing processor via said network means.

* * * * *